Dec. 22, 1942.     A. H. NEULAND     2,305,891
INTERNAL COMBUSTION ENGINE
Filed April 25, 1940     4 Sheets-Sheet 1

INVENTOR.
Alfred H. Neuland

Dec. 22, 1942.                A. H. NEULAND                2,305,891
                        INTERNAL COMBUSTION ENGINE
                          Filed April 25, 1940          4 Sheets-Sheet 3

INVENTOR.
Alfons H. Neuland

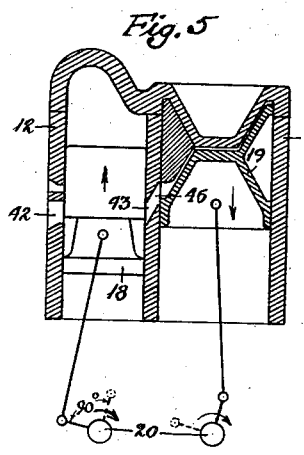
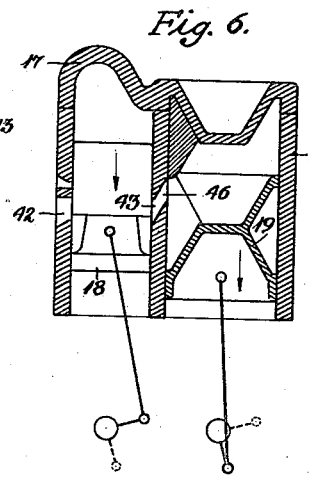
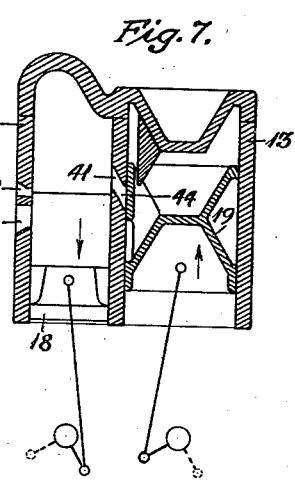
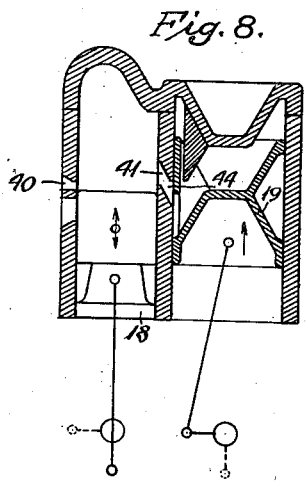
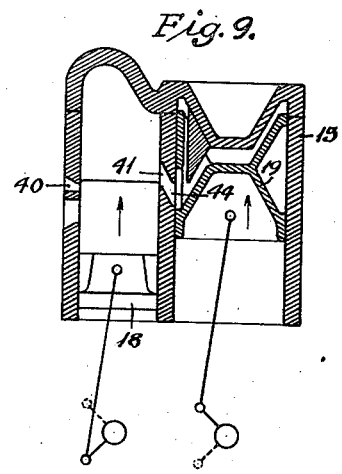
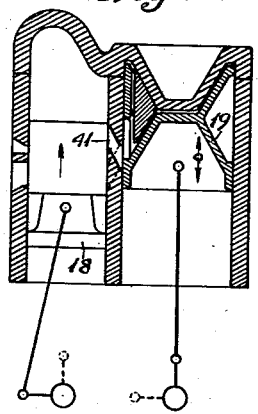

Patented Dec. 22, 1942

2,305,891

UNITED STATES PATENT OFFICE 2,305,891

INTERNAL COMBUSTION ENGINE

Alfons H. Neuland, Cleveland, Ohio

Application April 25, 1940, Serial No. 331,572

10 Claims. (Cl. 123—59)

This invention relates to internal combustion engines and particularly to engines of the two stroke cycle type, and its object is to provide an improved engine of high efficiency and power, light weight and relatively simple construction.

Generally, my invention resides in a novel construction and arrangement of combustion and induction cylinders and pistons and their association with each other and with cooling means to provide a compact engine in which the combustion cylinders are positively and uniformly charged or supercharged without the aid of auxiliary valves and are effectively cooled without the aid of an external radiator.

One feature of my invention consists of the construction and arrangement of combustion and induction cylinders and pistons, and the connection of the pistons to the cranks of the engine shaft whereby the pistons serve as valves to control charging of the induction cylinder and the effective transfer of the charge or supercharge to the combustion cylinder during or after the exhaust period.

The present invention is in part a continuation of my copending application Serial Number 324,546 filed March 18, 1940, in which I have disclosed an engine having induction and combustion cylinders and pistons capable, among other things, to control the exhaust and to secure positive and effective charging of the inductions cylinder and transfer of the charge to the combustion cylinder. One feature of the present invention provides greater expansion for the products of combustion and makes it possible to secure better efficiency from a high degree of supercharge.

Another feature of my invention provides for alternately charging two combustion cylinders from a single induction cylinder and enables me to provide an engine of great power.

Still another feature of my invention provides for substantial neutralization of the power impulses on the crankshaft, eliminates intermediate crankshaft bearings and greatly simplifies construction and assembly of the engine.

The foregoing and other objects, features and advantages of my invention will appear in the following description and from the drawings showing a preferred embodiment of my invention and will hereafter be more fully defined in the appended claims.

Figs. 5 to 10 inclusive are diagrammatic views illustrating the valve action of the pistons during each cycle of operation.

Figure 1:
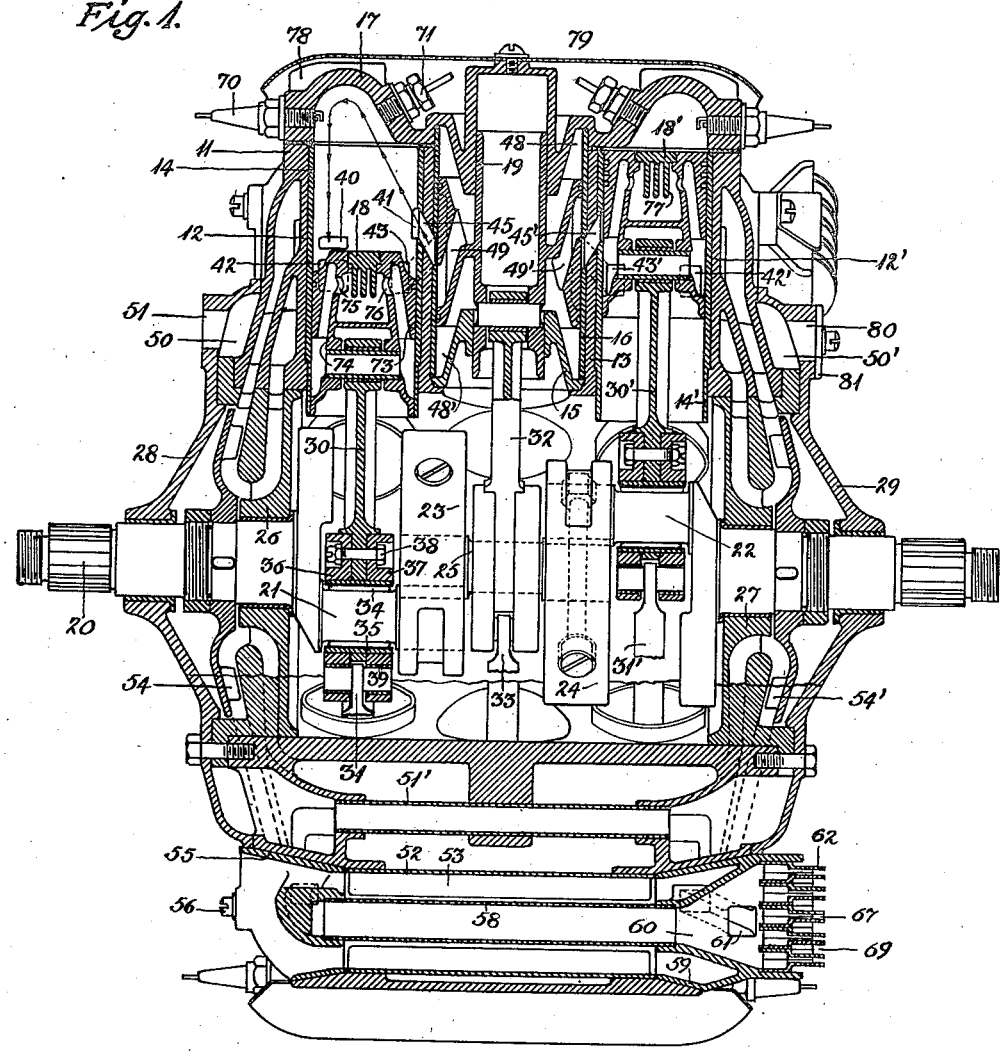
Fig. 1 is a section through an engine of my invention, the upper portion taken through the cylinders and related parts and the lower portion taken between the cylinders, showing the cooling element, exhaust ejector and related parts.
Figure 2:
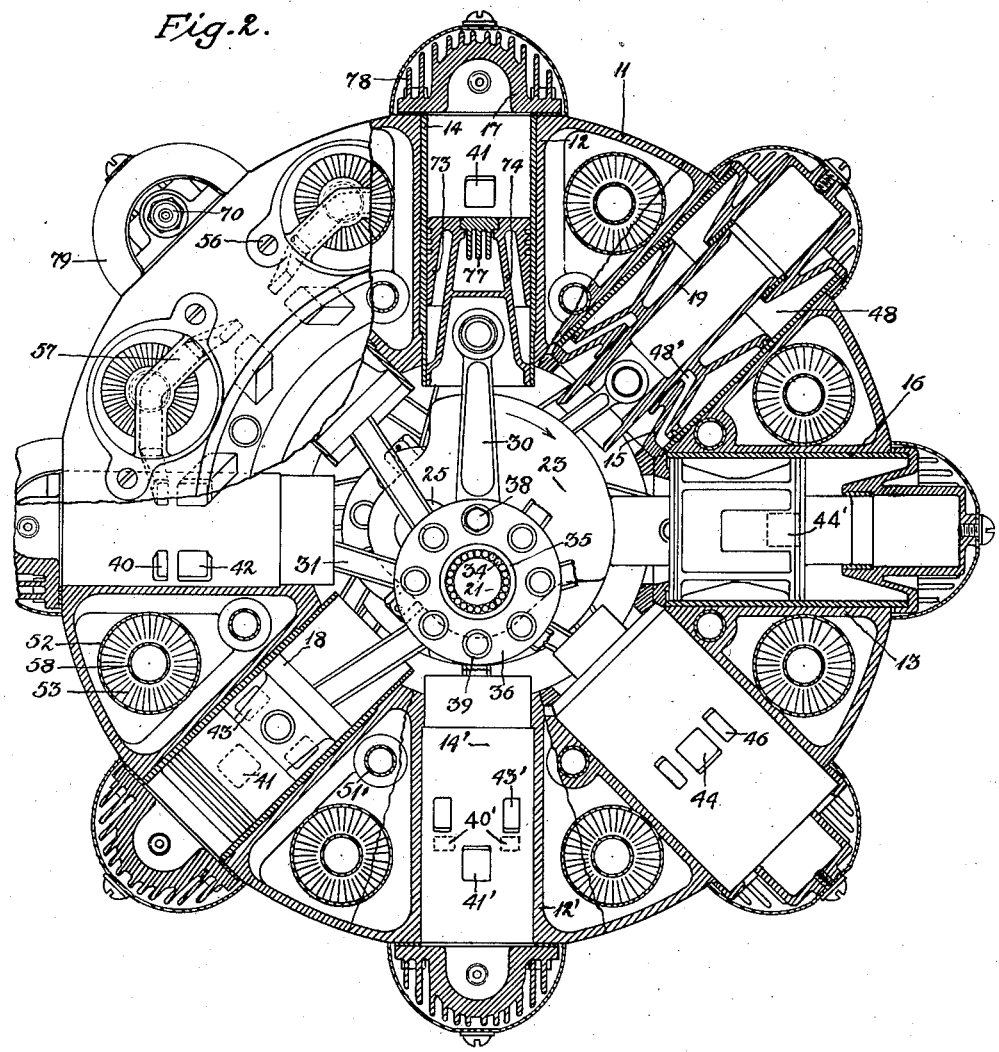
Fig. 2 is a partial cross section of the engine shown in Fig. 1, with portions cut away to show ports and ducts in the combustion and induction cylinders and pistons.
Figure 3:
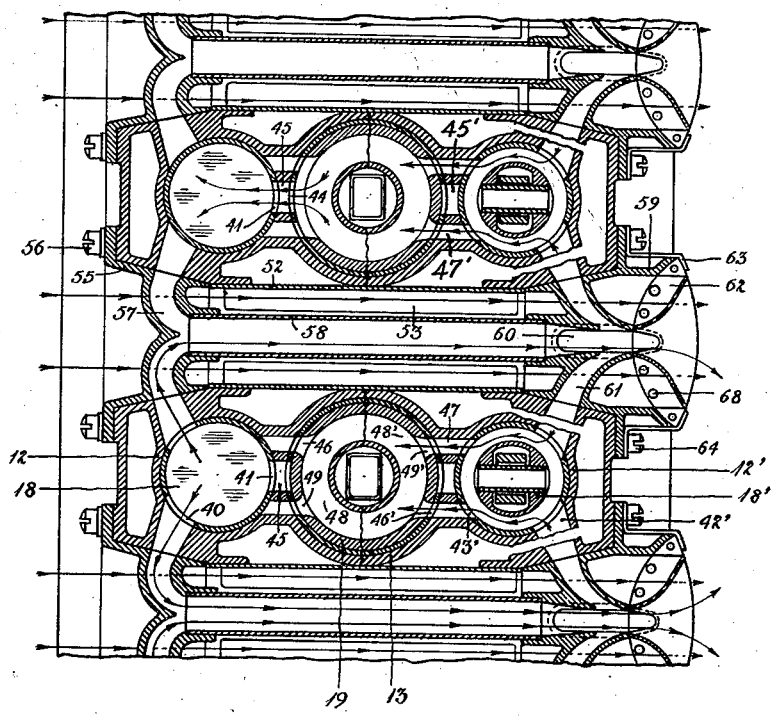
Fig. 3 is a developed sectional fragment through the cylinders, ducts and cooling elements showing the induction and exhaust streams and the cooling air streams.

Referring to the illustrated embodiment of my invention and particularly to Figures 1, 2 and 3, the numeral 11 designates an engine casing with which open ended combustion cylinders 12, 12' and induction cylinders 13 are associated and preferably cast integral therewith to form a cylinder block. Each pair of axially in line combustion cylinders is separated by an induction cylinder arranged in close proximity there between forming a double acting induction unit or valve. When a plurality of these units are used to form a radial engine I prefer to employ an even number of units the purpose whereof will hereafter be set forth. In the present instance there are eight evenly spaced units arranged in a circle consisting of two rows of combustion cylinders and an intermediate row of induction cylinders and forming a strong and rigid cylinder block well suited for casting in one piece from aluminum or other light metal. Each pair of combustion cylinders is provided with a liner 14, 14' preferably press fitted within the cylinder bores, and each induction cylinder is provided with an inner head 15 and a liner 16 slip fitted within the bore to facilitate assembly, the liners being held in place by heads 17 preferably formed in one piece to provide closures for the outer open ends of the cylinders in each unit. Each pair of combustion cylinders is provided with combustion pistons 18, 18' and each induction cylinder with a double acting induction piston or valve 19. In the illustrated embodiment I provide an assembled crankshaft 20 to facilitate assembly and permit the use of circumferentially unbroken master connecting rods and cylinders formed as part of the engine block. The crankshaft consists of separate end portions, each provided with a power crankpin 21, 22 extending beyond the journal surface and into the counterweighted clamp elements 23, 24 which serve to lock the central induction crankpin 25 and the end portion of the crankshaft securely together. The power cranks are arranged on opposite sides of the shaft and have an angular displacement of 180°, while the central induction crank is arranged intermediate and at right angles to the end power cranks, leading one of the power cranks by 90° and trailing the other power crank by 90° with respect to rotation of the crankshaft. The shaft is supported adjacent the end crank pins by the bearing brackets 26, 27 of special construction and by the auxiliary bearing brackets 28, 29 which will hereafter be more fully described. The combustion pistons 18 associated with one row of combustion cylinders are connected to the end crank 21 by means of the master and auxiliary connecting rods, 30, 31; the combustion pistons 18' associated with the other row of combustion cylinders are connected with the end crank 22 by means of the master and auxiliary connecting rods 30', 31', and the induction pistons are connected with the central induction crank 25 by means of the rods, 32, 33. Each master connecting rod includes rollers 34 and an outer race 35 having end portions extending beyond the bore in the central rod, over which end rings 36 and 37 are closely fitted and secured to the central rod by means of the bolt 38. The end rings are provided with bearings 39 within which the journal bosses of the auxiliary rods are fitted and held in alignment by the race 34 and bolt 37. With this construction it is possible to attach all rods including the center portion of the rod to their respective pistons, and insert them through the open outer ends of the cylinders to be joined together by the end rings after they are in place. Thereupon the crank pin extensions are slipped through the rod bearings and in the bores of the clamp elements 23, 24 and firmly clamped together. With this construction I am able to secure the advantages inherent in a cylinder block of unitary construction and at the same time secure the greater strength and rigidity that are characteristic of circumferentially unbroken elements for tying all connecting rods together. The special construction of the crankshaft is not clamed herein but forms the subject matter of a separate application Serial No. 332.212 filed April 29, 1940.

From the hereafter following description it will be seen that the engine operates on the two stroke cycle principle. Each row of cylinders develops eight overlapping power impulses per revolution and with my arrangement of an even number of cylinders in each row I secure a substantial neutralization in the deflection of the crankshaft during each impulse in one row by a simultaneous and substantially equal power impulse in the other row of cylinders opposing the deflection of the crankshaft and permitting elimination of an intermediate bearing and the structural complications resulting therefrom. It will be seen that in instances where both ends of the shafts are connected to a load, the clamped portion of the crankshaft need only transmit one half of the difference of the power delivered to one shaft end with respect to that delivered to the other end and never exceeds one half of the total power developed by the engine in instances where all the power is taken off from one end of the shaft. With eight power impulses per revolution the torque is substantially smooth and uniform and because of the neutralization in the deflection of the shaft as above described the assembled crankshaft is well suited to transmit the torque developed by the engine.

Each pair of combustion cylinders and the induction cylinder associated therewith form a substantially independently operable unit and the following description of one of the units is equally applicable to each of the other units. I provide each combustion cylinder with one or more exhaust ports 40, 40' arranged to be uncovered by the combustion pistons near the end of the expansion stroke and to be covered near the beginning of the compression stroke preferably arranged to face outwardly, that is away from the induction cylinder. Each pair of combustion cylinders is also provided with ports 41, 41', which will hereafter be referred to as transfer ports, arranged adjacent to the induction cylinder and outwardly with respect to the exhaust port, to be uncovered by the piston head before the exhaust port has been opened and to be covered after the exhaust port has been closed. I further provide the combustion cylinders with auxiliary ports comprising one or more inlet ports 42, 42' and with one or more outlet ports 43, 43' positioned inwardly with respect to the exhaust ports and adapted to be uncovered by the skirted portion of the piston when in an outerly position, that is during a portion of the compression and combustion strokes; the outlet ports being arranged adjacent to the induction cylinder and the inlet ports preferably at some point away from the induction cylinder. From the foregoing and from Fig. 1, it is seen that the ports in the combustion cylinders of each unit are identical, and that the cylinder at the right can be assumed to have been rotated half way around so that like ports in the cylinders face in opposite directions. In this connection it should be noted that the numerals to which a prime mark is applied indicate the provision of an identical port when not shown in the combustion cylinder at the right side of the engine as a corresponding port shown in a combustion cylinder at the left side of the engine identified by the same numeral without the prime mark. Similarly the ports in the right half of the induction cylinder are also identical with the ports in the left half thereof and the numerals to which a prime mark is applied likewise indicate the provision of an identical port in the right half of the induction cylinder as a corresponding port shown in the left half identified by the same numeral without the prime mark.

The induction cylinder is preferably positioned with respect to the adjoining combustion cylinders so that its longitudinal center is substantially aligned with the top of the combustion piston head when at the bottom of its stroke. I provide induction transfer ports 44, 44' at the center of the induction cylinder facing the ports 41, 41' respectively in the combustion cylinders and connected therewith by means of the transfer ducts 45, 45', and I further provide the induction cylinder at or near its center with intake or charging ports 46, 46' connecting the interior of the induction cylinder with the outlet ports 43, 43' respectively in the combustion cylinder through the intake or charging ducts 47, 47'. In the engine shown by the drawings, there are two intake ports and ducts on each side of the induction cylinder and two inlet and outlet ports as well as two exhaust ports in each combustion cylinder to facilitate circulation of the working fluid through the engine, although it will be understood that a single port of each kind may in some instances suffice and that in other instances it may be desirable to provide several ducts of each kind.

The induction piston also serves as a valve and is preferably constructed as shown in Figures 1 and 2. It includes a trunk portion 19 closely fitted to reciprocate within bores in the inner and outer heads 15 and 17, and an outer double cup-like portion attached to the trunk near its center or formed as part thereof and having the inner walls of the cupped portions extending into the displacement chambers preferably tapered as shown to alternately fit within the cone shaped outer and inner heads as the piston reciprocates. The upper part of the induction cylinder forms a displacement chamber 48 which communicates with the ducts 45, 47 through the piston duct 49, and the lower part of the cylinder forms a displacement chamber 48' which communicates with ducts 45', 47' through the piston duct 49'; the piston ducts 49, on the left side of the induction piston, terminating in a U shaped opening in the outer piston wall positioned so that its side portions register with the intake ports 46 during the entire induction piston stroke and so that the bridge portion registers with the transfer port 44 only during the latter part of the induction piston outward compression stroke. The piston duct 49' terminates in an identical U shaped opening on the right side of the induction piston except that it is inverted, that is with the bridge portion at the top, to register during the latter part of the compression stroke when the induction piston moves inwardly, that is toward the crankshaft, the sides of the U opening again registering during the entire piston stroke.

From the lower portion of Fig. 1, it will be seen that all inlet ports 42 on the left side of the engine terminate in an inlet distributing chamber 50 formed by the casing and the bearing bracket 28, and that the inlet ports 42' on the right side of the engine terminate in an inlet distributing chamber 50' formed by the casing and the bearing bracket 29. I provide communication between the inlet chambers 50 and 50' in order to supply all cylinders with working fluid preferably from one side of the engine through the inlet opening 51 in the bracket 28 to which a carburetor, not shown, may be fitted. In the illustrated engine this is accomplished by a plurality of tubes 51' arranged between radially adjacent cylinders, extending axially through the casing and having their ends press fitted within bores in the casing to provide a tight seal. The aggregate section of the tubes is considerable, affords an effective conduit for the transfer of fluid between the inlet chambers and eliminates outside plumbing and complications. Working fluid may be conducted into the engine through the opening 80 at the other end of the engine, in which case the cover plate 81 may be employed to close the opening 51.

Arranged between each of the cylinder units and extending through the cylinder block or casing, I provide cooling elements consisting of a tube 52 and a plurality of closely spaced cooling fins 53 attached to the tube by some means such as hard soldering or welding, the ends of the tube being press fitted within bores in the casing to form a tight seal. I further provide a liqu'd coolant within the casing and the impellers 54 and 54' secured to the engine shaft for vigorously circulating the coolant past the cylinders and cooling elements for the effective transfer of heat therebetween. The brackets 26, 27 are shaped to form pump housings so as to draw the coolant from the inner part of the casing to be expelled through the spaces formed by the inlet and exhaust ducts, the cylinders and the casing.

Figure 4:
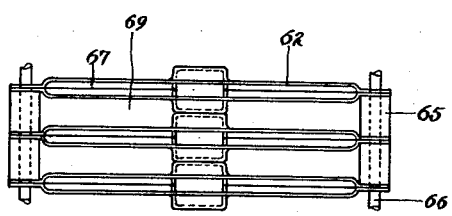
Fig. 4 shows the construction of the exhaust gas ejector for impelling the cooling air stream.

In my copending application Serial No. 324,546, filed March 18, 1940, I have shown a single row engine and means for impelling an air stream through the cooling elements by the exhaust gas from the combustion cylinders. My present invention includes means for more effectively impelling the cooling air stream with the exhaust gas by prolonging the flow of the exhaust gas through the ejector during each revolution of the shaft. I provide a plurality of exhaust manifolds 55 shaped to form taper plugs fitted within taper bores arranged between the cylinders on the left side of the casing, held in place by the screws 56 and provided with ducts for the passage of the cooling air stream and with passages 57 connecting the exhaust ports 40 in adjacent cylinders with tubes 58, which extend axially through the center of the cooling elements preferably spaced same distance from the cooling fins 53. The right side of the engine is provided with exhaust manifolds 59 also shaped to form taper plugs and fitted within taper bores in the casing. The exhaust plugs 59 also serve to conduct the cooling air stream and are provided with an exhaust gas distributing chamber 60 connected with the exhaust tube 58 and also with the exhaust ports 40' through the passages 61 in the plug. The outer surface of the exhaust plugs 59 is preferably arcuate and adapted to fit the exhaust gas ejector or cooling air impeller 62, the plugs and ejectors being secured to the casing by means of the clamps 63 and screws 64. Fig. 4 shows the detailed construction of a preferred form of ejector. It consists of a series of sheet metal plates 62 with alternate plates reversed to form pairs, spacers 65 between the pairs and rivets or bolts 66 for assembling the parts to form a unit. It will be seen that each pair of plates forms a central wide mouthed opening which registers with the opening in the exhaust gas chamber of the plug and that as the duct spreads toward the sides its flattens into a narrow duct 67 which is open on the outer side for the escape of the exhaust gas and closed on the inner side facing the air stream by some means such as welding or by the rivets 68. The ejector forms the exhaust gas into a plurality of narrow streams, interlinks these streams flatwise with a series of cooling air streams flowing through the narrow ducts 69 formed by the spaces intermediate the exhaust ducts, establishes a partial vacuum in the cooling elements and thereby vigorously impells the cooling air stream through the cooling elements.

With the arrangement above described each ejector is supplied by exhaust gas from adjacent units including four combustion cylinders. With eight cylinders per row the spacing between adjacent cylinders is 45° and since the exhaust port remains open during approximately 60° of crankshaft revolution the ejector is supplied with exhaust gas by circumferentially adjacent cylinders in one row during about 105° of crankshaft revolution and after an interval of 75° of revolution is supplied by adjacent cylinders in the other row during another 105° of crankshaft revolution insuring a vigorous flow of air through each of the cooling elements.

As heretofore stated the combustion pistons cooperate with the induction pistons to establish a flow of working fluid through the engine so as to develop a power stroke per revolution in each cylinder. The working fluid may be a gaseous mixture supplied to the inlet opening 51 to be ignited by the spark plug 70 near the top of the combustion piston compression stroke, or the inlet opening 51 may be supplied merely with air and the fuel injected into the engine in liquid form by suitable means such as the injector 71 in the combustion cylinder head and the mixture ignited by the spark plug 70 or by high compression, in which case the spark plug may be dispensed with. In either case working fluid is drawn into the chambers 50, 50' through the inlet opening 51 and tubes 51' and distributed to all the inlet ports 42, 42' in the combustion cylinders. As the combustion piston moves into an outerly position, the piston skirt uncovers inlet and outlet ports 42, 43, the working fluid traverses the space formed by the inner and outer skirts and the cylinder wall and flows into the induction cylinder through the charging duct 47. The paths taken by the working fluid through the engine are particularly shown in Fig. 3 in which the lower portion is a section taken through the active ports of the cylinders with the pistons in the position shown in Fig. 1. Assuming that the engine shaft rotates in a clockwise direction when viewed from the left, it is seen that the induction piston 19 moves outwardly and draws working fluid into the inner displacement chamber 48' through inlet and outlet ports 42', 43' which are uncovered, the combustion piston 18' being in an outerly position during the outward stroke of the induction piston and the paths taken by the working fluid into displacement chamber 48' being shown by the arrows at the lower right of Fig. 3. From Fig. 1 it will be seen that the combustion piston in the cylinder at the left is at the bottom of its expansion stroke, the exhaust ports 40 are uncovered and that the exhaust gases escape through the exhaust ports 40, exhaust passages 57 in adjacent plugs, exhaust tubes 58 and chamber 60 into the ejector 62 as shown by the arrows in Fig. 3, with piston 18 in an innerly position, inlet and outlet ports 42, 43 are covered and the outwardly moving induction piston 19 compresses the working fluid trapped in the upper displacement chamber 48. However, the induction transfer port 44 is at this moment still closed, but is about to open as shown in Fig. 1. In the illustrated engine the transfer port is arranged to open just as the combustion piston 18 passes bottom center and while the exhaust ports are wide open, but it will be understood that the transfer port may be arranged to be uncovered earlier or later than shown, depending upon the particular operating characteristics it is desired to secure. In the upper part of Fig. 3, I have shown the existing conditions in an adjacent unit in which the exhaust ports in cylinder 12 have just been covered by piston 18 and the transfer port 44 has just been uncovered by induction piston 19 admitting the partly compressed working fluid from the displacement chamber 48, as shown by the arrows. Inlet and outlet ports 42', 43' in cylinder 12' are still open and working fluid continues to flow into the lower displacement chamber 48' until piston 19 reaches the end of its strokes when piston 18' covers ports 42', 32' and traps the working fluid within displacement chamber 48' to be compressed on its downward or inward stroke and to be transferred to combustion cylinder 12' when combustion piston 18' passes bottom center and the transfer port 44' is uncovered by the inverted U opening at the right side of induction piston 19.

It should be noted that the timing and sequence in the opening and closing of the ports on the right side of the engine is identical with that on the left side and insures uniform charging of the cylinders in each unit and smooth and effective operation of the engine. This is accomplished by the construction and arrangement of ports above described and by connecting the combustion pistons in each unit with opposed power crank spaced 180° apart and by connecting the induction piston with an induction crank arranged intermediate and spaced 90° from the power cranks, and further by connecting the combustion cylinder associated with the trailing power crank with the displacement chamber in which compression is developed during the outward stroke of the induction piston, and connecting the combustion cylinder associated with the leading power crank with the displacement chamber in which compression is developed during the inward stroke of the induction piston. In the illustrated engine the outer displacement chamber is connected with the cylinder at the left associated with the trailing power crank and the inner displacement chamber is connected with the cylinder at the right associated with the leading power crank.

The cooperation between the pistons for the induction, transfer and exhaust of the working fluid will best be understood from the diagrams in Figures 5 to 10 inclusive which show the relative positions of the pistons and the connections or passages which they establish at six different points of each cycle. In the diagrams only one combustion cylinder and a single acting induction cylinder has been shown, forming an operable unit. The central trunk portion of the induction piston has been omitted and the rod is shown connected directly to an extention at the bottom of the cup. The induction piston developes compression during its outward stroke and is connected to a crank which leads the power crank by 90° with respect to rotation of the crankshaft 20 in a clockwise direction. In the diagrams the power and induction cranks have been shown separately to clearly show their relative angular position, the dotted line showing the position of the companion crank. In Fig. 5, the piston 18 is moving outwardly and has just begun to uncover inlet and outlet ports 42, 43 and the inwardly moving induction piston 19 now draws the working fluid through the charging port 46 into the induction cylinder 13 and as the crankshaft rotates, ports 42, 43 open completely and remain open until the induction piston 19 nears the end of its suction stroke shown in Fig. 6, in which the now inwardly moving piston 18 is about to cover ports 42 and 43, and as these ports close, the working fluid is trapped within cylinder 13 and a further rotation of the crankshaft causes the induction piston to commence its outward stroke and to compress the working fluid within the induction cylinder. Fig. 7 shows a section taken through the transfer ports 41 and 44. The transfer port 41 in the combustion cylinder has been uncovered by combustion piston 18 but the transfer port 44 in the induction cylinder is still covered by induction piston 19, preventing communication between the cylinders. In Fig. 7, the piston 18 has nearly reached the end of its expansion stroke and has uncovered exhaust port 40, permitting the burnt gases to escape from cylinder 12, and as piston 18 reaches the bottom of its stroke as shown in Fig. 8, the induction piston uncovers transfer port 44 and forces the partly compressed working fluid through the transfer ports 44 and 41 into the combustion cylinder. From the figures and particularly from Fig. 1, it will be seen that the transfer duct 45 terminating in the port 41 is arranged at a steep angle so as to blow the working fluid towards the cylinder head, which is shaped to direct the stream downward toward the exhaust ports 40 and thereby provide thorough scavenging of the combustion cylinder during the period that the exhaust and transfer ports are both open. With this arrangement for transferring the working fluid to the combustion cylinder under a predetermined pressure and after the exhaust ports have opened, I am able to delay opening of the exhaust ports until the combustion piston has nearly reached the end of its expansion stroke and secure a maximum expansion ratio without sacrificing thorough scavenging of the combustion cylinders.

As the crankshaft continues to rotate, the pistons assume the positions shown in Fig. 9 in which the outwardly moving combustion piston 18 has closed the exhaust port 40 and entered its compression stroke. However the outwardly moving induction piston 19 continues its compression stroke and increases the pressure within the induction cylinder to any degree required to force the remaining working fluid into the combustion cylinder through the transfer port 41, which remains open until the induction piston 19 reaches substantially the end of its compression stroke when the piston 18 covers transfer port 41 and traps the working fluid within the combustion cylinder, as shown in Fig. 10, where it is further compressed by the outwardly moving piston 18 and ignited near the top of the piston stroke.

The increase in the induction pressure which I thus secure during the induction or transfer period and particularly after the exhaust port has closed makes efficient supercharging during high speed operation as well as during low speed operation possible to a degree not attainable with induction systems using a scavening or induction compressor in which the pressure does not substantially vary during the induction period and in response to changes in the conditions of operation. In order to force substantially all the working fluid out of the induction cylinder, the inserts 72, shown in Figures 5 to 10, may be provided attached to the head 17 and shaped to fit within the passages in the piston 19 when at the end of the compression stroke and to displace the working fluid from the passages.

It should be noted that the cylinders may be proportioned to provide any desired degree of charge or supercharge. In the illustrated engine the displacement of the induction cylinders exceeds that of the combustion cylinders by about 50% and provides a substantial supercharge which may be varied by a throttle attached to the intake opening 51 in an obvious manner, not shown.

From Figures 1 and 2 it will be seen that I provide means for effectively cooling the internal surface of the combustion pistons with the working fluid, as it is drawn into the engine, consisting of an outer skirt 73 and an inner skirt 74 forming an annular space therebetween which serves to conduct the working fluid between inlet and outlet ports 42, 43 and provides a large cooling area. Furthermore I provide an inner central cooling chamber communicating with the annular space through the openings 75, 76, which serve to conduct a portion of the fluid in and out of the chamber past the prongs 77 attached to the inner side of the piston head.

It is often desirable to maintain a relatively higher temperature in the head and in the combustion chamber of an engine, especially when operating with compression ignition or when liquid fuel is injected into the combustion chamber. In my engine, I provide means for cooling the cylinder heads separately from the cylinders, consisting of the cooling fins 78 which may be provided with covers 79 adapted to conduct a predetermined volume of cooling air past the heads. With this arrangement I am able to maintain a relatively low temperature in the engine cylinders and a relatively higher temperature in the engine head and in the combustion chamber and thereby reduce the ignition lag and secure smoother operation and better efficiency especially when the engine is highly supercharged and operated with compression ignition.

The absence of hot spots, usually caused by the presence of exhaust valves in the combustion chamber, permits the use of a higher degree of supercharge and compression when the engine is operated with spark ignition, which also results in higher efficiency.

As heretofore stated either a single combustion cylinder or a pair of combustion cylinders may be combined with an induction cylinder and associated parts to form an independently operable single or double unit. One such unit may be arranged to form an engine developing a single or double power impulse respectively per revolution, or a plurality of either single or double units may be employed and arranged in various ways, that will readily suggest themselves to those familiar with the art, to develop a plurality of evenly or unevenly spaced power impulses per revolution.

It should be noted that various changes may be made in the details of construction and combination of the various parts of my engine and one or more of the features disclosed herein may be used in the illustrated or other embodiments without departing from the spirit of my invention, and I desire to cover by my claims such changes and other embodiments which may be reasonably included within the scope of my invention.

I claim as my invention:

1. In a two stroke cycle internal combustion engine a crankshaft having an induction crank, a leading power crank arranged on one side and at right angles and a trailing power crank arranged on the other side and also at right angles with respect to said induction crank, a double acting induction piston connected with the induction crank and an induction cylinder associated therewith having a displacement chamber adapted to be compressed when the induction piston moves away from the crankshaft and having a second displacement chamber adapted to be compressed when the induction piston moves toward said crankshaft, a combustion cylinder connected with the first mentioned displacement chamber having a piston connected with the trailing power crank, a second combustion cylinder connected with said second displacement chamber having a piston connected with the leading power crank, means including a port in the first mentioned combustion cylinder for conducting working fluid into the first mentioned displacement chamber, and means including a port in the second combustion cylinder for conducting working fluid into said second displacement chamber.

2. In a two stroke cycle internal combustion engine, a pair of combustion cylinders, each provided with a transfer port, a combustion piston for each of said cylinders adapted to uncover the transfer port, a valve housing having one transfer port for each of said cylinders, a transfer duct for each combustion cylinder adapted to connect its transfer port with a transfer port in said valve housing, means for conducting working fluid into the engine, a valve associated with said valve housing and adapted to uncover the transfer ports and to admit said working fluid alternately first into one and then into the other combustion cylinder, a crankshaft having a pair of opposed power cranks and intermediate auxiliary reciprocating means arranged at right angles to said power cranks, and means for connecting the combustion pistons to the power cranks and the valve to the auxiliary reciprocating means so that the transfer port in the valve housing is not uncovered until after the associated transfer port in the combustion cylinder has been uncovered.

3. In a two stroke cycle internal combustion engine, a crankshaft, an engine block associated with the crankshaft shaped to form a plurality of angularly displaced combustion cylinders and a plurality of angularly displaced induction cylinders associated with the combustion cylinders, a conduit arranged between the cylinders to extend axially through the engine block and adapted to conduct working fluid to the induction cylinders, and means for transferring the working fluid from the induction cylinders to the combustion cylinders.

4. In a two stroke cycle internal combustion engine, a crankshaft, an engine block associated with the crankshaft shaped to form a plurality of angularly displaced combustion cylinders and a plurality of angularly displaced induction cylinders associated with the combustion cylinders, a cooling element arranged between the cylinders within the engine block and adapted to conduct a stream of cooling air axially through said block, a liquid coolant associated with the combustion cylinders and cooling element and adapted to cool the said cylinders, an exhaust conduit connected with the combustion cylinder and arranged within the cooling element to extend axially through the engine block, means for charging the induction cylinders with a working fluid, means for transferring the working fluid from the induction cylinders to the combustion cylinder, and means for exhausting the combustion cylinder through said exhaust conduit.

5. In a two stroke cycle internal combustion engine, a crankshaft, an engine block associated with the crankshaft shaped to form a plurality of angularly displaced cylinder units, each unit having a pair of outer combustion cylinders associated with an intermediate induction cylinder arranged axially in line, means for charging the induction cylinders with working fluid including a conduit arranged between the cylinders extending axially through an innerly portion of the engine block, means for transferring the working fluid from the induction cylinders to the combustion cylinders, and means for exhausting angularly adjacent combustion cylinders including an exhaust conduit arranged between the cylinders and extending axially through an outerly portion of the engine block.

6. In a two stroke cycle internal combustion engine, a crankshaft, an engine block associated with said crankshaft shaped to form a plurality of angularly displaced combustion cylinders, a plurality of angularly displaced induction cylinders associated with the combustion cylinders, an axial bore in said block, a cooling element associated with one portion of said bore and arranged between the cylinders within the engine block to conduct a stream of cooling air axially through said block, a liquid coolant associated with the combustion cylinders and cooling element and adapted to transfer heat therebetween, an exhaust conduit arranged within and extending through said cooling element, a hollow plug arranged within another portion of said bore and provided with a duct connected with said exhaust conduit, means for charging the induction cylinders with a working fluid, means for transferring the working fluid from the induction cylinder to the combustion cylinder, and means for exhausting the combustion cylinder through said exhaust conduit.

7. In a two stroke cycle internal combustion engine, a crankshaft having a pair of opposed cranks, a double acting induction piston connected with the crankshaft having a pair of ports and an induction cylinder associated therewith having a displacement chamber adapted to be compressed when the induction piston moves in one direction and having a second displacement chamber adapted to be compressed when the induction piston moves in the opposite direction, a combustion cylinder having a piston connected to one of said cranks and having means for connecting it with the first mentioned displacement chamber including one of said ports in the induction piston, a second combustion cylinder having a piston connected to the other crank and having means for connecting it with the second displacement chamber including the other of said ports in the induction piston, means including a port in the first mentioned combustion cylinder adapted to be uncovered by its piston for conducting working fluid into the first mentioned displacement chamber, and means including a port in the second combustion cylinder adapted to be uncovered by its piston for conducting working fluid into said second displacement chamber.

8. In an internal combustion engine, a crankshaft, an engine block associated with said crankshaft shaped to form a bank of in line combustion cylinders and a second bank of in line combustion cylinders angularly displaced with respect to said first bank and further shaped to form a jacket surrounding said cylinders having axially separated end walls and an opening in each end wall arranged angularly intermediate said banks of cylinders, a separately formed cylindrical cooling element arranged within the jacket between the banks having its end portions aligned with said openings and tightly secured to said end walls and being adapted to conduct cooling air axially through the block, a liquid coolant within the jacket adapted to transfer heat from the cylinders to the outer surface of the cooling element, and a plurality of cooling fins associated with the inner surface of the cooling element and adapted to transfer heat from the cooling element to the cooling air.

9. In an internal combustion engine, a crankshaft, an engine block associated with said crankshaft shaped to form a bank of in line combustion cylinders and a second bank of in line combustion cylinders angularly displaced with respect to said first bank and further shaped to form a jacket surrounding said cylinders having axially separated end walls and an opening in each end wall arranged angularly intermediate said banks of cylinders, a separately formed hollow cooling element arranged within the jacket between the banks and adapted to connect the openings in the end walls and to conduct cooling air axially through the block, a liquid coolant within the jacket adapted to transfer heat from the cylinders to the outer surface of the cooling element, and a plurality of cooling fins associated with the inner surface of the cooling element and adapted to transfer heat from the cooling element to the cooling air.

10. In a two stroke cycle radial internal combustion engine: a non-rotatable block having a circumferentially unbroken outer section and a pair of end sections forming therewith a crankcase; an assembled rotatable crankshaft in said crankcase comprising a pair of end portions, each provided with an inwardly extending crank-pin and with a main journal operatively supporting the end portions of the crankshaft by the crankcase end sections and further comprising a central portion having means for locking said crankshaft end portions together to form a centrally unsupported crankshaft assembly providing a pair of diametrically opposed crankpins; an even number of evenly spaced combustion cylinders forming a group fixedly associated with one longitudinal portion of the outer crankcase section having pistons connected with one of said crankpins and a like number of combustion cylinders axially aligned with the cylinders of said first mentioned group and fixedly associated with another longitudinal portion of said outer crankcase section to form a second group of cylinders having pistons connected to the other of said crankpins; and means for developing progressive power impulses in the cylinders of each group so that each power impulse developed in the cylinders in one group is accompanied by a simultaneous power impulse in a diametrically opposite cylinder in the other group whereby deflection of the unsupported portion of the crankshaft is substantially neutralized.

ALFONS H. NEULAND.